(12) United States Patent
Shi et al.

(10) Patent No.: US 8,681,628 B2
(45) Date of Patent: Mar. 25, 2014

(54) SYSTEMS AND METHODS FOR DETERMINING TOP SPREADERS

(75) Inventors: Xingang Shi, Hong Kong (CN); Dah-Ming Chiu, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 329 days.

(21) Appl. No.: 13/119,402

(22) PCT Filed: Sep. 10, 2009

(86) PCT No.: PCT/CN2009/073852
§ 371 (c)(1),
(2), (4) Date: Mar. 16, 2011

(87) PCT Pub. No.: WO2010/037308
PCT Pub. Date: Apr. 8, 2010

(65) Prior Publication Data
US 2011/0170413 A1    Jul. 14, 2011

Related U.S. Application Data

(60) Provisional application No. 61/101,522, filed on Sep. 30, 2008.

(51) Int. Cl.
*H04L 12/26* (2006.01)
(52) U.S. Cl.
USPC .......................... 370/235; 370/230; 370/252
(58) Field of Classification Search
USPC ................................................ 370/235, 241
See application file for complete search history.

(56) References Cited

U.S. PATENT DOCUMENTS

| | | | | |
|---|---|---|---|---|
| 6,473,400 | B1 * | 10/2002 | Manning | 370/229 |
| 6,798,746 | B1 * | 9/2004 | Kloth et al. | 370/235 |
| 2008/0219181 | A1 * | 9/2008 | Kodialam et al. | 370/252 |
| 2008/0273461 | A1 * | 11/2008 | Liang et al. | 370/235 |
| 2009/0028046 | A1 * | 1/2009 | Kanda et al. | 370/235 |

FOREIGN PATENT DOCUMENTS

| | | |
|---|---|---|
| CN | 1822548 A | 8/2006 |
| CN | 101309179 A | 11/2008 |

OTHER PUBLICATIONS

Flajolet, P. et al., "HyperLogLog: the analysis of a near-optimal cardinality estimation algorithm," DMTCS, Proceedings of the 2007 Conference on Analysis of Algorithms (AofA 07), pp. 127-145, 2007.

Metwally, A. et al., "Efficient Computation of Frequent and Top-k Elements in Data Streams," Database Theory—ICDT 2005, Proceedings of the 10th International Conference, Edinburgh, UK, Jan. 5-7, 2005, 21 pgs.

* cited by examiner

*Primary Examiner* — Anh-Vu Ly
*Assistant Examiner* — Hashim Bhatti
(74) *Attorney, Agent, or Firm* — Seed IP Law Group PLLC

(57) ABSTRACT

Disclosed are a method and a system for determining top spreaders in high speed network. The method may comprise: sampling a plurality of packets from the plurality of hosts during an interval of time; determining a difference between a count and a count error for each host based on the sampled packets; ranking the hosts based on the determined difference to identify a first set of hosts that are top in the ranked hosts; and selecting a second set of hosts from the first set of hosts as the top spreaders.

10 Claims, 6 Drawing Sheets

(*)HyperLogLog algorithm [1] is a cardinality estimation algorithm proposed by P. Flajolet, 2007.

SYSTEMS AND METHODS FOR DETERMINING TOP SPREADERS

CROSS REFERENCE TO RELATED APPLICATIONS

This application claims the benefit of U.S. provisional Application No. 61/101,522 filed on Sep. 30, 2008, of which the contents are incorporated herein by reference in its entirety.

BACKGROUND OF THE INVENTION

1. Technical Field

The disclosure of the application is related to systems and methods for determining top spreaders in high speed networks.

2. Related Prior Art

Efficiently and accurately identifying hosts that are spreading the largest amount of flows during an interval of time, so called top spreaders, is very important for managing a network and studying host behaviors on application level, ranging from detecting DDoS attack, worm propagation, peer-to-peer hot spots and flash crowds. No previous work has been able to efficiently and accurately identify the top spreaders at very high link speed, for example, 10 to 40 Gbps.

There has been a lot of work on measurement of traffic statistics for network management, security, and better understanding of internet and its evolvement. The size distribution and matrices of the flows may help network provisioning and traffic engineering. Finding flows that have a large number of packets is useful in billing and accounting. It has also been shown that flow level communication patterns may further reveal application level behaviors of each host.

To tell whether a host is a top spreader, it always needs to test if a flow count of the host is above a threshold according to one known method in the art. However, it's difficult to fix such a threshold. Even if the threshold can be fixed, there will be either too many or too few top spreaders. For most situations, it should be more interested in only a few top spreaders and their accurate flow numbers. However, no previous work has been able to accurately identify top spreaders on very high speed links in a large network, for example, under the speed of 10 to 40 Gbps, where the total host number is around hundred of thousands and the total flow number is around several millions, which happen on ISP backbone links.

SUMMARY OF THE INVENTION

The present invention application aims to propose a system and method to not only accurately identify the top spreaders, but also accurately estimate their spreading out cardinality, that is, the flow number of each identified top spreader.

In an aspect, there is disclosed a method for determining top spreaders from a plurality of hosts, comprising:
an identifier configured to receive a plurality of packets from the hosts during an interval of time and comprising:
  a difference determination unit configured to determine a difference between a count and a count error for each host based on the received packets; and
  an identifying unit configured to rank the hosts based on the determined difference to identify a first set of hosts in the ranked hosts; and
an estimator configured to select a second set of hosts from the first set of hosts as the top spreaders.

In other aspect, there is disclosed a method for determining top spreaders from a plurality of hosts, comprising:
sampling a plurality of packets from the hosts during an interval of time;
determining a difference between a count and a count error for each of the hosts based on the sampled packets;
ranking the hosts based on the determined difference to identify a first set of hosts in the ranked hosts; and
selecting a second set of hosts from the first set of hosts as the top spreaders.

According to the invention, it can work on the highest speed link that is 40 Gbps. It can handle millions of flows and hundreds of thousands of hosts with very limited memory, for example, only 700 KB memory is needed for 8M flows and 200K hosts. There is almost no error on the identified top 20 spreaders, and the relative error of the estimated flow numbers of these top spreaders are typically around 3%, and much smaller for more skewed data. No previous work can get such high efficiency and accuracy. The method is very easy to implement by modest hardware support and efficiently provides very accurate information to help these applications on very high speed large networks.

DETAILED DESCRIPTION OF THE INVENTION

Hereinafter, a detailed description of embodiments in the present application will be given with reference to the appended drawings.

Figure 1:
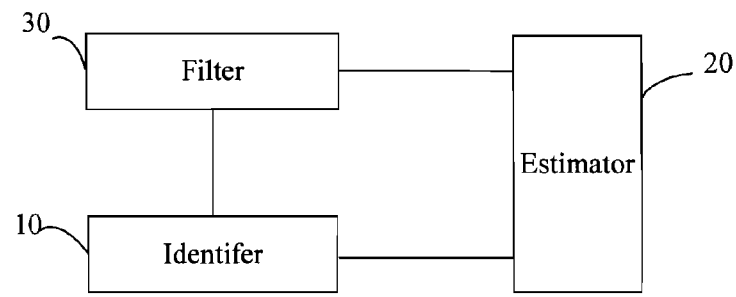
FIG. 1 is a block diagram schematically illustrating a system for determining top spreaders according to one embodiment of the application.

As shown in FIG. 1, a system 1000 for determining top spreaders from a plurality of hosts in high speed network comprises an identifier 10 and an estimator 20.

The identifier 10 operates to receive packets from data flows of c hosts in the network in a period of time, where c is the number of the hosts. The identification information for the hosts and data flows, i.e. host ID and flow ID, may be defined by any combination of fields in packet header, for example, IP address, port, protocol, and TCP flags. In one embodiment of the application, source address s is used as host ID, and the flow ID is represented by the 5-tuple $f=<srcIP, destIP, srcPort, destPort, proto>$. Those skilled in the art should understand that the invention should not be limited thereto, other fields in the packet header should be used to represent the host ID and flow ID, respectively.

The identifier 10 comprises a hash table 101, a min-heap 102, a counting unit 103, a difference determination unit 104, an identifying unit 105 and an updating unit 106.

Figure 2:
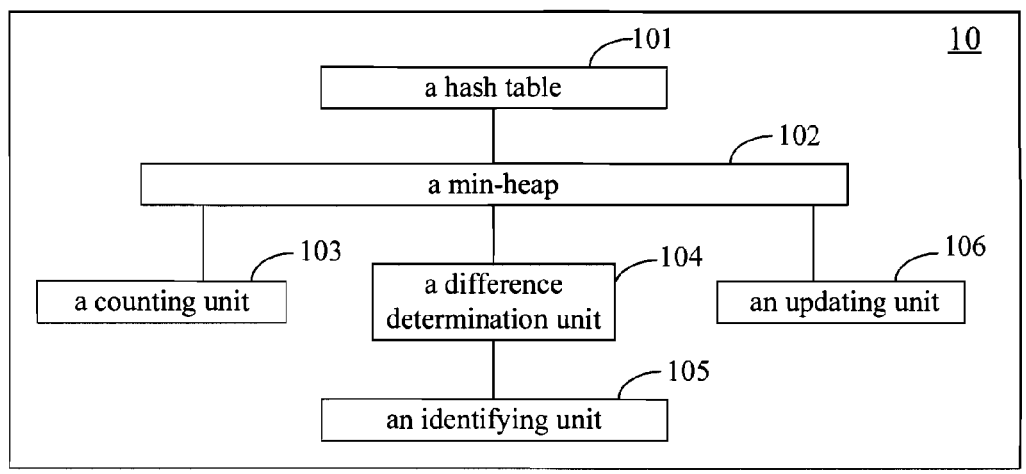
FIG. 2 is a block diagram schematically illustrating the structure of the identifier of the system as shown in FIG. 1.

As shown in FIG. 2, a key of a node in the hash table 101 is host ID, and a value of a node in the hash table 101 is a corresponding position of the node in the min-heap 102. Each node in the min-heap 102 has three fields, a host ID, a count, and a count error. At the beginning of the period of time, all the fields regarding the count and count error in the heap 102 are set to be zero.

For each arrival packet with a host ID s and a flow ID $f$, the counting unit 103 operates to check, through the hash table 101, if s is now counted by identifier 10, that is, to check whether s exists in the hash table 101 as a key.

If s exists in the hash table 101, the difference determination unit 104 operates to calculate the flow number $M_s$ for the host with ID s by the following equation:

$$M_s = count_s - err_s \qquad 1)$$

And then, the identifying unit 105 operates to determine whether $M_s$ is above an estimating threshold $T_2$. Typically, the estimating threshold $T_2$ may be set as a small integer number, e.g. 2-5. If it is, the identifying unit 105 determines that the host with the $M_s$ may be a potential super spreader, after which an updating command will be sent by the identifying unit 105 to the estimator 20 to carry out an updating processing, which will be discussed hereinafter.

At the end of the intended measurement period, all the hosts with the flow number being above $T_2$ are ranked by the identifying unit 105 according to the calculated flow numbers in a descending or ascending order. The top-2 k hosts in the ranked hosts are identified as potential top spreaders, where k is an integer. Although theoretically, k can be selected from 1 to the total number of hosts, here it only considers the situation where k is a small constant number, e.g. 10 or 20, when the network management and security is concerned.

As shown in FIG. 2, the identifier 10 is also configured with an updating unit 106 for updating the hash table 101 and the heap 102, which will be discussed hereinafter.

The estimator 20 is used to select top-k hosts from the top-2 k potential top spreader identified by identifier 10.

The estimator 20 includes a first counter 201 configured with w×n counting units (n columns, each column has w counting units), with each counting unit represented by for example, 5 bits.

Figure 3:
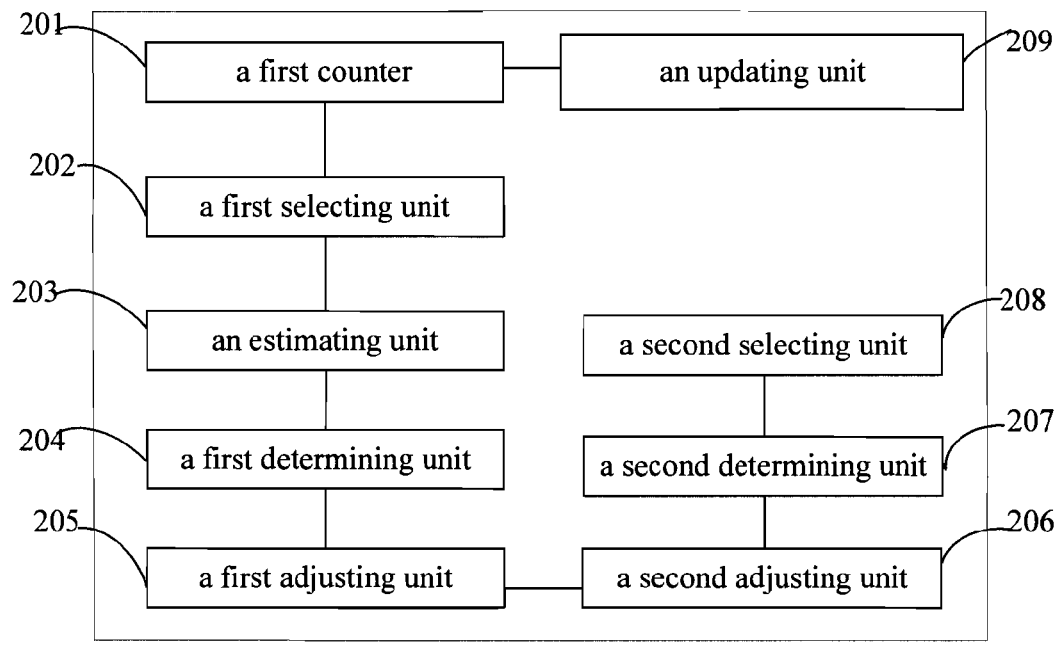
FIG. 3 is a block diagram schematically illustrating the structure of the estimator of the system as shown in FIG. 1.

As shown in FIG. 3, besides the first counter 201, the estimator 20 also includes a first selecting unit 202, an estimating unit 203, a first determining unit 204, a first adjusting unit 205, a second adjusting unit 206, a second determining unit 207, a second selecting unit 208 and an updating unit 209. The updating unit 209 is used to updating the first counter 201.

The processing for estimating the flow number for the host s with the units 201-208 will be firstly discussed in reference to FIG. 6 as below, and the updating processing of the updating unit will be discussed later.

Figure 6:
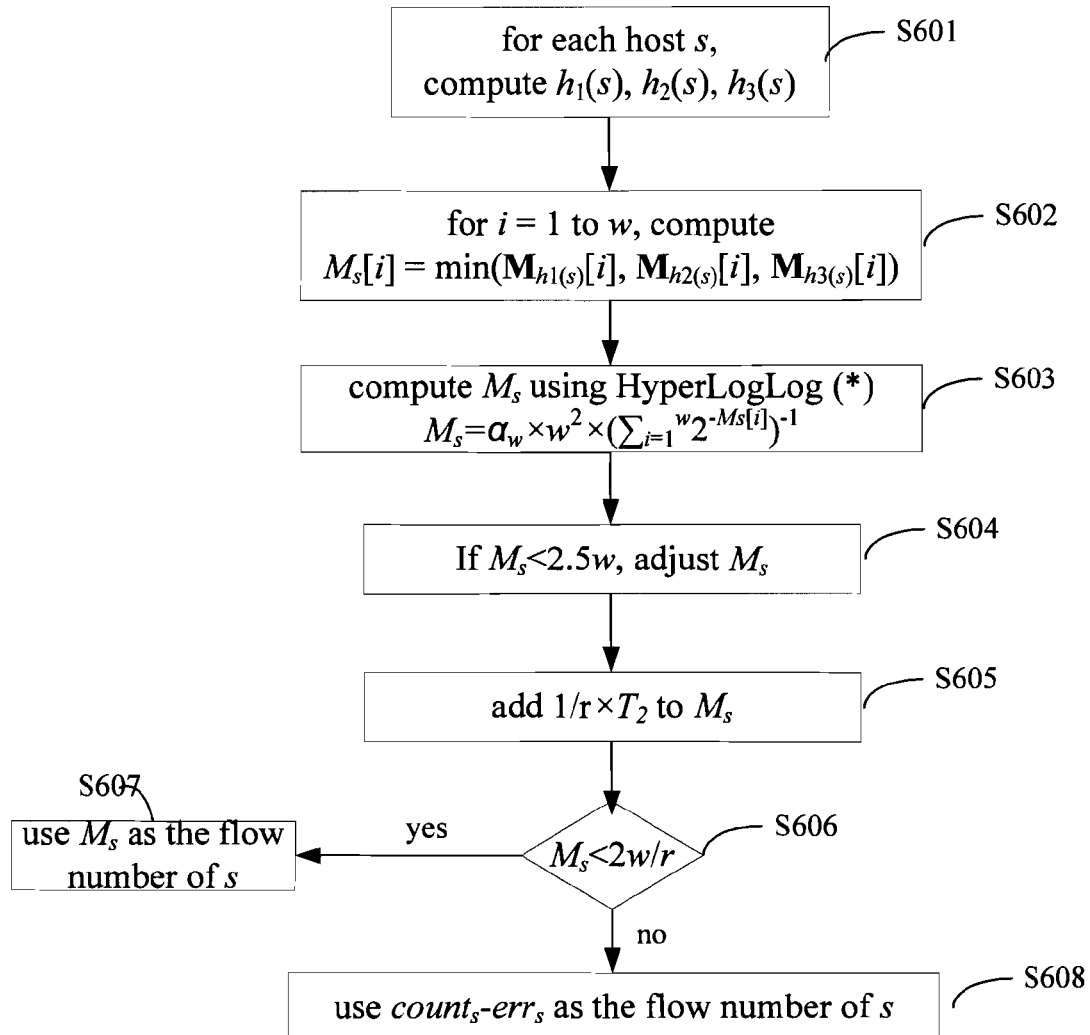
FIG. 6 is a flow diagram schematically illustrating a processing of computing the final flow number for hosts.

Referring to FIG. 6, in step S601, for the host with ID s, the first selecting unit 202 operates to select corresponding l columns of the counting units from the first counter 201 based on the ID s. In the embodiment, for the purpose of illustration, three columns of the counting units are selected (i.e., l=3).

Figure 5:
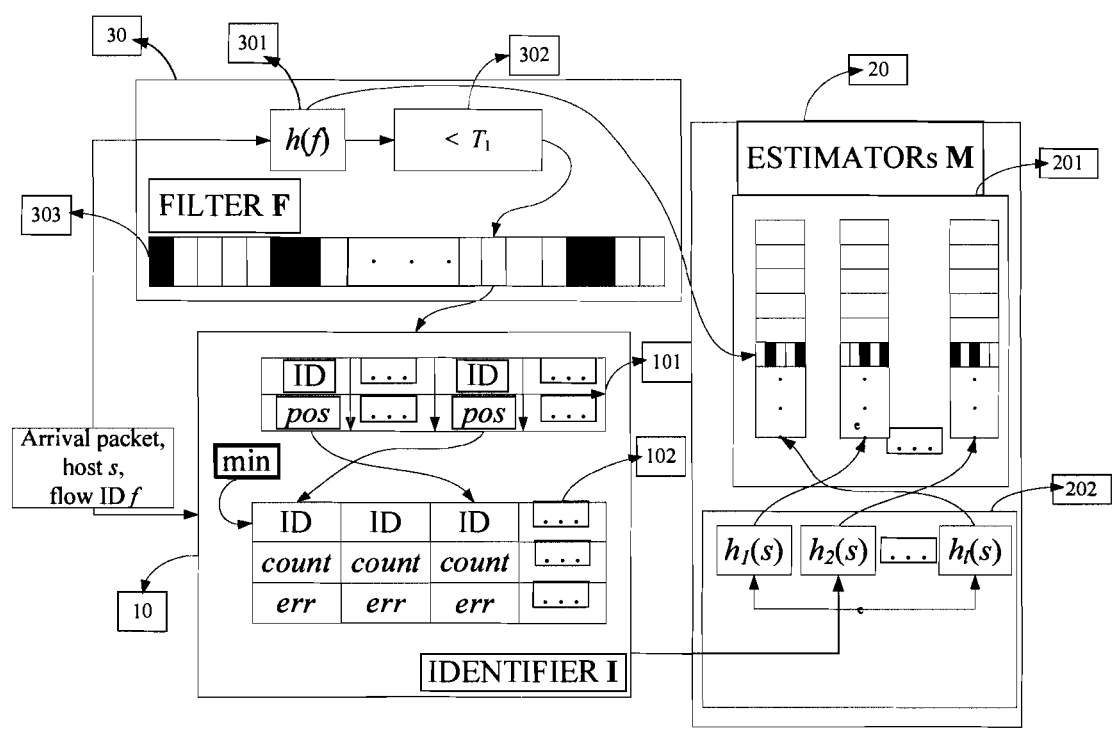
FIG. 5 is a system block diagram schematically illustrating the architecture with data structures for the system as shown in FIG. 1, wherein some units therein are omitted for the purpose of clarity.

As is shown in FIG. 5, the first selecting unit 202 is configured with l calculating units. Different calculating units may use different hash functions which can compute for example, 32 bits hash results, and each calculating unit is configured to use a hash function to select a column of counting units from the first counter 201 by the following equation.

$$column_s = h_i(s) \text{ for } i=1 \text{ to } l \qquad 2)$$

Where $column_s$ represents the selected column of the counting unit where an input parameter is the host ID s.

In step S602, the estimating unit 203 operates to select a minimal one from the selected three columns ($M_{h_1}(s)[i]$, $M_{h_2}(s)[i]0$ and $M_{h_3}(s)[i]$) in the same level as the estimation counter by the following equation, $$M_s[i] = \min(M_{h1}(s)[i], M_{h2}(s)[i], M_{h3}(s)[i]) \text{ for } i=1 \text{ to } w \qquad 3)$$

Figure 7:
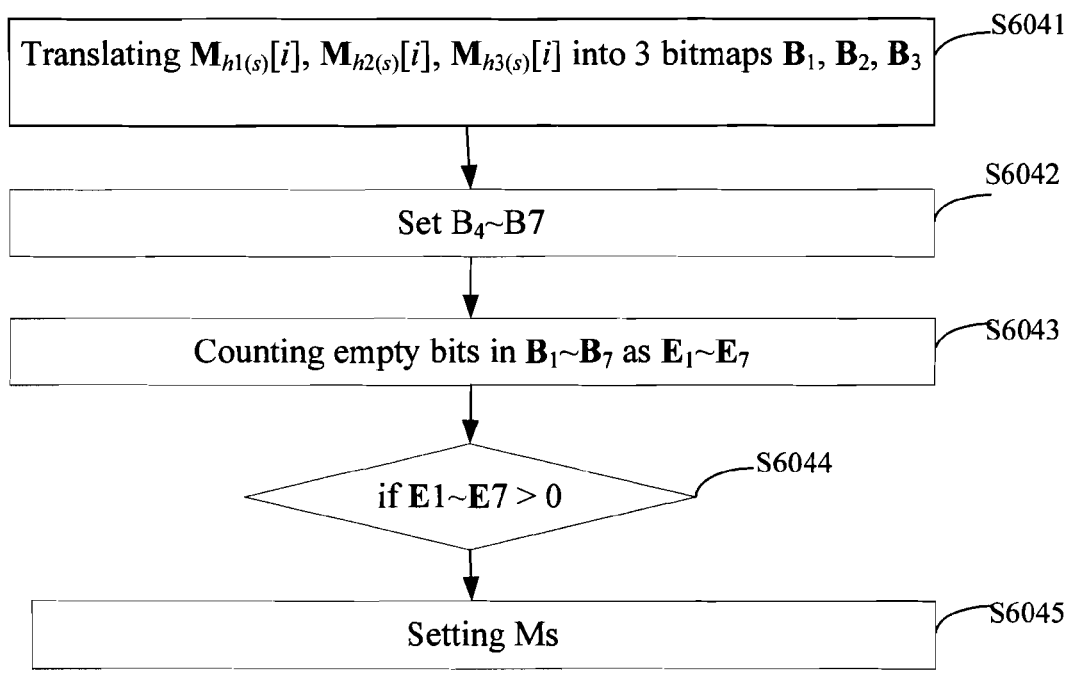
FIG. 7 is a flow diagram schematically illustrating the algorithm of adjusting the flow number for hosts.

In step S603, the estimating unit 203 operates to estimate the flow number Ms, for example, by the following equation, $$M_s = \alpha_w \times w^2 \times (\Sigma_{i=1}^{w} 2^{-Ms[i]})^{-1} \text{ for } i=1 \text{ to } w \qquad 4)$$

where $\alpha_w$ represents a bias correction parameter. For example, the value of $\alpha_w$ may be approximated by 0.72134 as proposed by P. Flajolet etc. in "Hyperloglog: The analysis of a near-optimal cardinality estimation algorithm", In Proc. of the 2007 International Conference on Analysis of Algorithms (AofA'07), June 2007. In step S604, the first determining unit 204 operates to determine whether the estimated number Ms is less than, for example, 2.5 w, wherein w is the number of counting units in each column in the first counter 201. If it is the case, the first adjusting unit 205 operates to adjust Ms using an algorithm as illustrated in FIG. 7 which will be discussed as below. Otherwise, $M_s$ needs no adjustment.

As shown in FIG. 7, in step S6041, the first adjusting unit 205 operates to translate $M_{h1(s)}[i]$, $M_{h2(s)}[i]$, $M_{h3(s)}[i]$ into 3 bitmaps $B_1$, $B_2$, $B_3$ by the following equation:

$$B_k[i]=0, \text{ if } M_{hk(s)}[i]=0;$$

$$B_k[i]=1, \text{ else for } i=1 \text{ to } w \qquad 5)$$

In step S6042, set $B_4=(B_1 \text{ or } B_2)$, $B_5=(B_1 \text{ or } B_3)$, $B_6=(B_2 \text{ or } B_3)$, $B_7=(B_1 \text{ or } B_2 \text{ or } B_3)$. And then in step S6043, the first adjusting unit 205 operates to count empty bits in $B_1$~$B_7$ as $E_1$~$E_7$, and then in step S6044 determine whether E1~E7 >0. If it is the case, the first adjusting unit 205 adjusts the number $M_s$ by the following rule in step S6045.

$$M_s = m\left(\ln\left(\frac{m}{E_1}\right) + \ln\left(\frac{m}{E_2}\right) + \ln\left(\frac{m}{E_3}\right) - \ln\left(\frac{m}{E_4}\right) - \ln\left(\frac{m}{E_5}\right) - \ln\left(\frac{m}{E_6}\right) + \ln\left(\frac{m}{E_7}\right)\right) \qquad 6)$$

Returning to FIG. 6, in step S605, the second adjusting unit 206 operates to further add a adjust value $1/r \times T_2$ to the adjusted flow number $M_s$, where r is the flow sampling rate.

Then in step S606, the second determining unit 207 operates to determine whether the adjusted number $M_s$ is less than another threshold 2w/r.

Next, the second selecting unit 208 selects the flow number of s based on the determination and outputs the top-k hosts with the largest flow numbers as the top spreaders. Specifically, in the case that the adjusted number Ms is less than 2w/r, the Ms is determined as the flow number of s in step S607; otherwise, the difference $count_s - err_s$ is used as the flow number of s in step S608.

Figure 4:
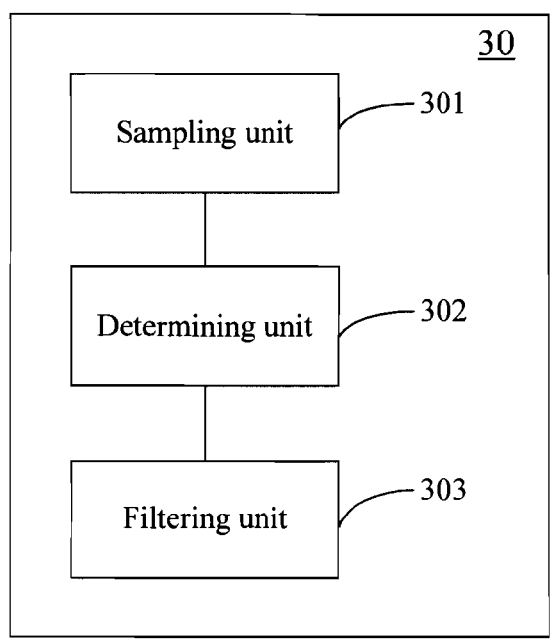
FIG. 4 is a block diagram schematically illustrating the structure of the filter of the system as shown in FIG. 1.

Referring to FIG. 1 again, the system 100 further comprises a filter 30 configured to sample packets from data flows of hosts in the network in the period of time, and for each sampled packet it provides a flow number increment to update the identifier 10. As shown in FIG. 4, the filter 30 is configured with a sampling unit 301, a determining unit 302 and a filtering unit 303.

The sampling unit 301 operates to sample the arrival packets and to calculate a value of $V_f$ based on the flow ID $f$ by the following equation:

$$V_f = h(f) \qquad 7)$$

Where h( ) is a uniform hash function that may calculate, for example, a hash result of 32 bits.

An array F of m bits is arranged in the filtering unit 303. At the beginning of the sampling, all bits of the array are set to be zero.

The determining unit 302 operates to determine whether the calculated $V_f$ is less than a predetermined sampling threshold $T_1$. If yes, this packet is sampled, and then filter 30 checks $F[V_f]$. If $F[V_f]=0$, then it operates to set $F[V_f]=1$, and send an updating command with a increment value to the identifier 10 to carry out an updating processing, which will be discussed as below. Specifically, if the number of empty bits in the array F in the filtering unit 303 is e, then the increment value should be m/e.

Hereinafter, the updating processing for the identifier 10 and estimator 20 will be discussed, respectively.

1. Processing for Updating the Identifier 10

In the embodiment, the processing for updating the identifier 10 may use any known top-k element methods, for example, the Space-Saving algorithm proposed by Metwally, 2006. Specifically, it is supposed that the increment value is m/e for the host s, then the updating unit 106 operates to add m/e to the count of s in the heap 102 if s is in the table 101; or find the key $s_{min}$ which has the minimal count value $count_{min}$ in the min-heap 102, set the corresponding err value in the min-heap 102 to be $count_{min}$, increase $count_{min}$ by m/e, replace the ID $s_{min}$ in the min-heap 102 with s, and replace the node corresponding to $s_{min}$ in the hash table 101 by a new node corresponding to s.

2. Processing for Updating the Estimator 20

When the identifying unit 103 in the identifier 10 determines that $M_s$ is higher than the estimating threshold $T_2$, the updating unit 209 in the estimator 20 operates to select three calculating units in the first selecting units 202, represented as $M_{h1(s)}$, $M_{h2(s)}$ and $M_{h3(s)}$, and set counter $M_{hi(s)}[V_f]=\max(M_{hi(s)}[V_f], \rho(V_f))$, where $\rho(h(f))$ is the position of the leftmost 1 in binary presentation of $V_f$.

Figure 8:
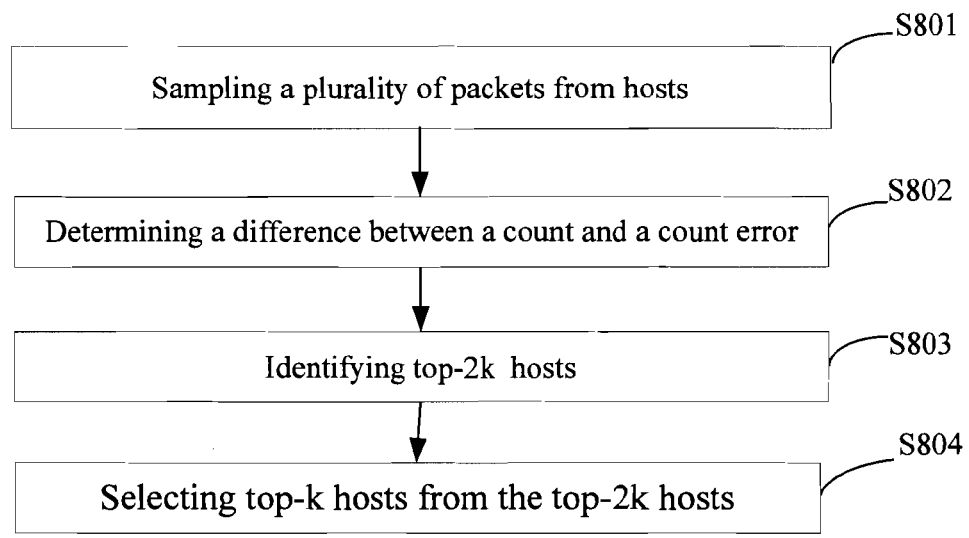
FIG. 8 is a flow diagram schematically illustrating a processing for determining top spreaders according to one embodiment of the application.

Hereinafter, a processing 2000 for determining top spreaders from a plurality of hosts will be discussed in reference to FIG. 8.

At step S801, a plurality of packets from the plurality of hosts during an interval of time is sampled, for example, with the filter 30, and the estimator 20 is updated as discussed above. At step S802, a difference between a count and a count error for each host is determined based on each sampled packet. At step S803, the hosts are ranked based on the determined difference so as to identify the top-2 k hosts in the ranked hosts. At step S804, top-k hosts is selected from the top-2 k hosts as the top spreaders, which is illustrated in FIG. 6 and the detailed discussion thereof is omitted.

The above disclosed system 1000 may be implemented by software, hardware, firmware and any combination thereof. The processing 2000 may be carried out for example by the system 1000. On the case that the system 1000 is implemented by software, the parameters may be chosen as: $m=2^{23}$, w=256, n=1000 and c=1000, then it costs around 700 KB memory, and may be installed in high speed memory such as SRAM.

In addition, since the identifier 10 is configured with a min-heap 102, it needs at most 2 log c memory operations to update a count in the heap 102. When c=1000, this value is 20, so it may use a flow sampling rate of 1/16 such that less than 2 memory operations are needed on average, and can handle 40 Gbps by SRAM. To handle extreme situations when flows come in burst and flow sampling select continuous flows, a small buffer can be used to temporarily save update information.

Moreover, the inventors have conducted experiments on various data, including synthetic data and real traffic traces. There is almost no error on identified top spreaders, the relative error of estimated flow number is typically less than 3%, and is much smaller for more skewed data. The maximum flow number we are dealing with is 8M, the maximum number of hosts is 200K, and the memory cost is at most 700 KB.

The present application is not limited to the embodiments mentioned above. Other embodiments obtained by the skilled in the art according to the technical solutions in the present application should be within the scope of the technical innovation of the present application.

The invention claimed is:

1. A system for determining top spreaders from a plurality of hosts, comprising:
   sampler configured to sample a plurality of packets from the hosts during an interval of time;
   a difference determiner configured to determine a difference between a count of data flows from each host and an error of the count based on the sampled packets; and
   ranker configured to rank the hosts based on the determined difference to identify a first set of hosts in the ranked hosts; and
   an estimator configured to select, as the top spreaders, a second set of hosts from the first set of hosts based on data flows from the identified first set of hosts.

2. A system of claim 1, wherein the estimator further comprises:
   first estimator configured to estimate a flow number for each of the first set of hosts; and
   a selector configured to select, from the ranked first set of hosts, the second set of hosts based on the estimated flow number.

3. A system of claim 2, wherein the estimator further comprises:
   a first determiner configured to determine whether the estimated flow number is less than a first predetermined threshold; and
   a first adjustor configured to adjust the estimated flow number if the estimated flow number is less than the first predetermined threshold.

4. A system of claim 2, wherein the estimator further comprises:
   a second adjustor configured to further adjust the adjusted flow number by a predetermined rule; and
   wherein the selector is further configured to select the second set of hosts based on the adjusted flow number.

5. A system of claim 4, wherein the predetermined rule is such that an adjust value is added to the adjusted flow number, where the adjust value is associated with a sampling rate of the system.

6. A system of claim 4, wherein the selector is configured to select the second set of hosts with the adjusted flow number by:
   determining the adjusted flow number as a final flow number, if the adjusted flow number adjusted by the second adjustor is less than a second predetermined threshold; otherwise,
   determining said difference as a final flow number; and
   selecting the second set of hosts with the largest final flow numbers.

7. A system of claim 1, further comprising:
   a filter configured to determine a first packet of a flow consisting of the plurality of packets from the hosts so as to determine the interval of time.

8. A method for determining top spreaders from a plurality of hosts, comprising:
- sampling a plurality of packets from the hosts during an interval of time;
- determining a difference between a count of data flows from each host and an error of the count based on the sampled packets;
- ranking the hosts based on the determined difference to identify a first set of hosts in the ranked hosts; and
- selecting, as the top spreaders, a second set of hosts from the first set of hosts based on data flows from the identified first set of hosts.

9. A method of claim 8, wherein the selecting further comprises:
- calculating a flow number of each of the first set of hosts;
- ranking the first set of hosts by the calculated flow numbers; and
- selecting at least one host from the ranked hosts as the top spreaders based on the calculated data flow number.

10. A method of claim 9, wherein the calculating further comprises:
- estimating the flow number for each of the first set of hosts;
- adjusting the estimated flow number, if the estimated flow number is less than a first predetermined value;
- determining the adjusted flow number as the flow number if the adjusted number is less than a second predetermined value; or
- determining the difference as the flow number if the adjusted number is equal to or larger than the second predetermined value.

* * * * *